(No Model.)
D. BASCH.
CAP FOR BICYCLE VALVES.
No. 565,825. Patented Aug. 11, 1896.
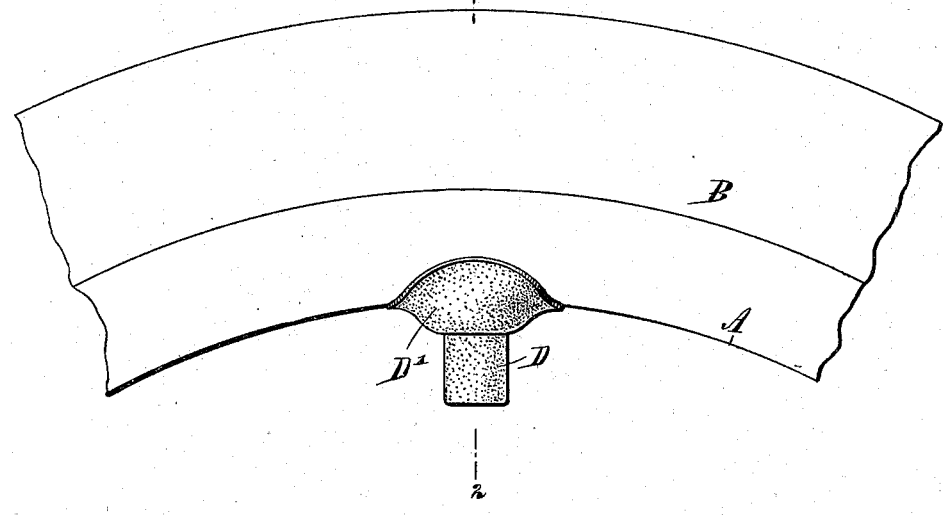
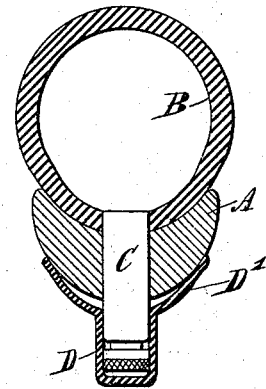
WITNESSES:
H. Walker
Fred Acker
INVENTOR
D. Basch.
BY
ATTORNEYS.

UNITED STATES PATENT OFFICE.

DAVID BASCH, OF NEW YORK, N. Y.

CAP FOR BICYCLE-VALVES.

SPECIFICATION forming part of Letters Patent No. 565,825, dated August 11, 1896.

Application filed May 11, 1896. Serial No. 591,046. (No model.)

*To all whom it may concern:*

Be it known that I, DAVID BASCH, of New York city, in the county and State of New York, have invented a new and Improved Cap for Bicycle-Valves, of which the following is a full, clear, and exact description.

The object of this invention is to construct a cap especially adapted to cover the exposed portion of a valve employed in connection with pneumatic tubes in bicycles, the cap being so constructed that it will be held in place by suctional engagement with the rim of a bicycle-wheel, preventing leakage from the valve and also preventing the loss of the metal valve-cap, which frequently happens while the bicycle is in motion, especially when the wheel is carried over rough surfaces, the cap also serving to prevent the accumulation of dirt between the tire and the rim; and a further object of the invention is to construct the suction-cap for bicycle-valves in such a way that it will be simple, durable, and economic.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in both figures.

Figure 1 is a side elevation of a portion of a rim and tire of a bicycle-wheel and a side elevation of the improved cap applied to a valve for the tire, and Fig. 2 is a transverse section taken practically on the line 2 2 of Fig. 1.

In carrying out the invention the rim A of the wheel is provided with the usual convexed inner face, and the tire B may be of any desired construction, as likewise the valve C. The cap for the valve is preferably made of rubber, and is in one piece, comprising a tubular body portion D and a cup D'. The body D of the cap is of sufficient diameter and of sufficient length to receive and entirely cover the exposed portion of the valve C, and when the body of the cap has been placed over the valve its cup-section D' is forced to a contact with the inner face of the rim A around the valve, and will cling thereto through suction.

It is evident that when this suction-cap is used all parts of the valve will be protected, and that the space between the valve and the rim will be completely covered.

The cap is readily placed in position on the valve, and is conveniently removed therefrom when desirable. It adds comparatively little to the weight of the wheel, and may be made an ornament to said wheel.

Having thus described my invention, I claim as new and desire to secure by Letters Patent—

A suction-cap for bicycle-valves, constructed of rubber and comprising a tubular body closed at one end, and a cup formed at the open end of the body, the concaved face of the cup being its outer face, as and for the purpose specified.

DAVID BASCH.

Witnesses:
ARTHUR B. SALINGER,
LOUIS H. SOLOMON.